W. E. URSCHEL.
MACHINE AND PROCESS FOR STEMMING FRUIT.
APPLICATION FILED NOV. 29, 1918.
1,409,804.
Patented Mar. 14, 1922.
3 SHEETS—SHEET 1.
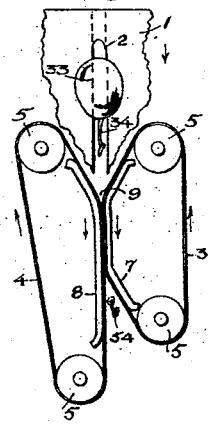
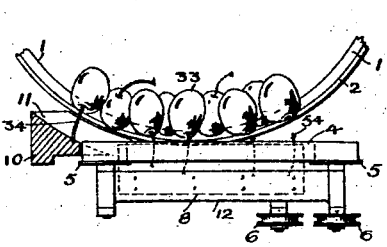
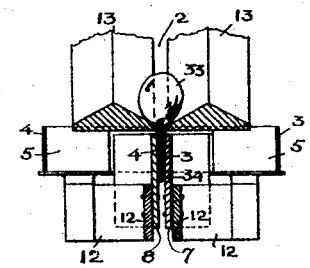
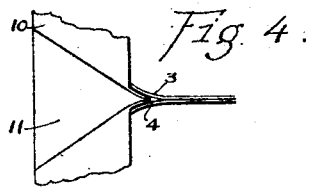
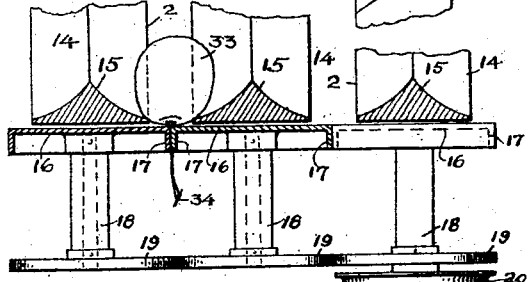
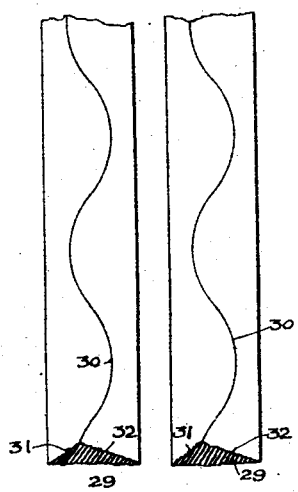
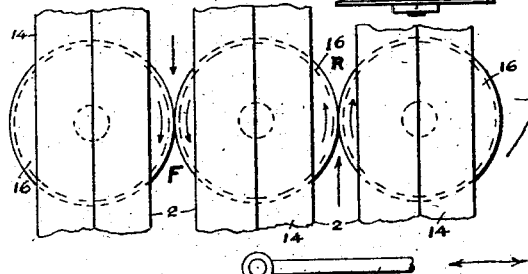
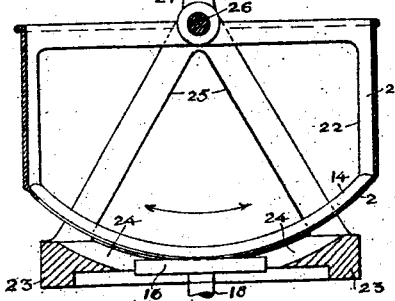
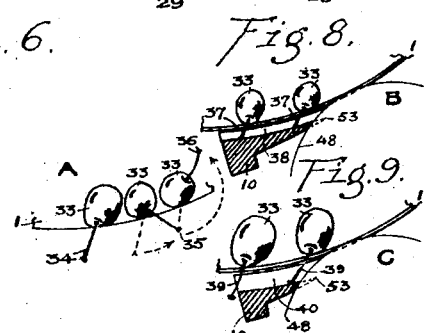

W. E. URSCHEL.
MACHINE AND PROCESS FOR STEMMING FRUIT.
APPLICATION FILED NOV. 29, 1918.

1,409,804.

Patented Mar. 14, 1922.
3 SHEETS—SHEET 2.

William E. Urschel Inventor
By H. S. Amstutz Attorney

W. E. URSCHEL.
MACHINE AND PROCESS FOR STEMMING FRUIT.
APPLICATION FILED NOV. 29, 1918.
1,409,804.
Patented Mar. 14, 1922.
3 SHEETS—SHEET 3.
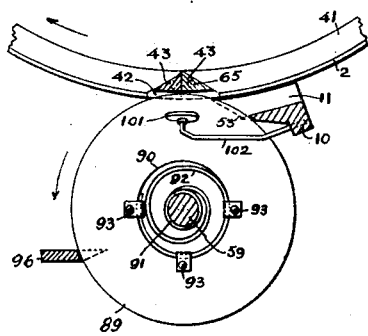
Fig. 14.
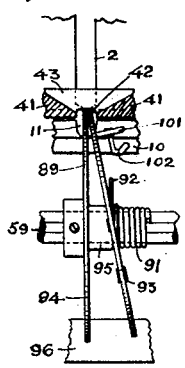
Fig. 15.
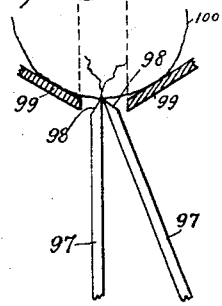
Fig. 17.
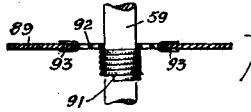
Fig. 16.
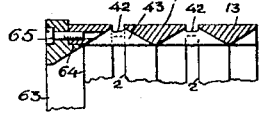
Fig. 18.
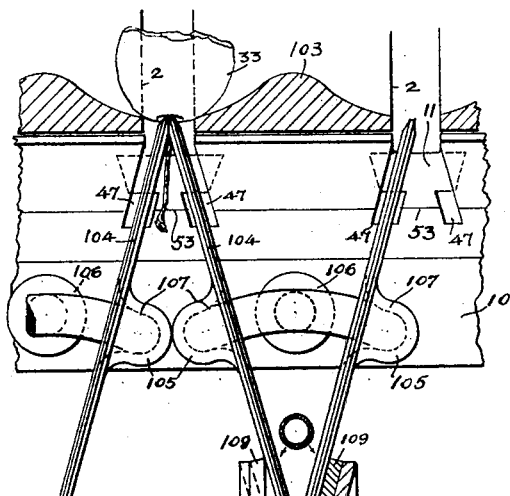
Fig. 19.
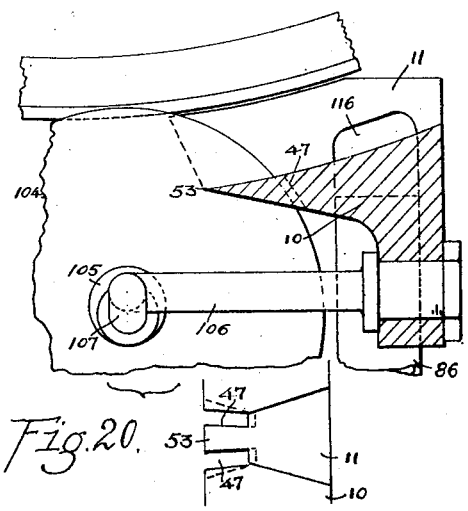
Fig. 20.
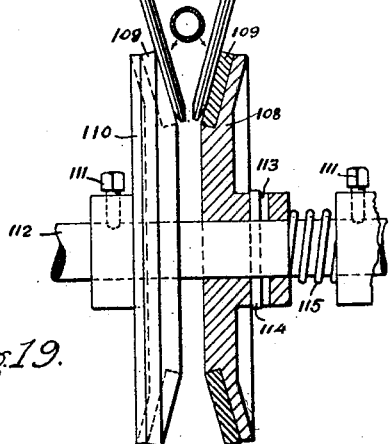
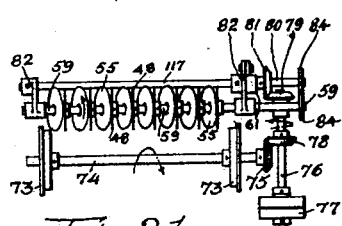
Fig. 21.
William E. Urschel, Inventor
By H. S. Annstutz, Attorney

UNITED STATES PATENT OFFICE.

WILLIAM E. URSCHEL, OF VALPARAISO, INDIANA.

MACHINE AND PROCESS FOR STEMMING FRUIT.

1,409,804.

Specification of Letters Patent.  Patented Mar. 14, 1922.

Application filed November 29, 1918. Serial No. 264,594.

*To all whom it may concern:*

Be it known that I, WILLIAM E. URSCHEL, citizen of the United States, residing at Valparaiso, in the county of Porter and State of Indiana, have invented certain new and useful Improvements in a Machine and Process for Stemming Fruit, of which the following is a specification.

My invention relates to fruit stemming machines and the process therefor and it consists more especially of the features pointed out in the annexed claims.

The purpose of my invention is to provide a stemming device that will gently remove the stems from various fruits with the least injury to the fruit itself; to provide a simple and effective device at reasonable cost and with few operating parts; to further provide means that are adapted for stemming, or slitting and skinning fruits with substantially the same mechanism; that gradually brings the stems to the stemming position; that also gently detaches the stems; that extends the duration of the stemming action; that causes a slow and gentle movement of the fruit away from the stemming position; and that provides various forms of stemming elements adapted to different practical demands.

With these and other ends in view I illustrate in the accompanying drawings such instances of adaptation as will disclose the broad idea which underlies the invention without limiting myself to the specific details shown.

Fig. 1 is a diagrammatic plan view of an arrangement of suggestive elements to illustrate the underlying principle of the invention.

Fig. 2 is an elevation of Fig. 1, also in diagrammatic relation.

Fig. 3 is a transverse diagrammatic elevation in section of Fig. 2.

Fig. 4 is a diagrammatic plan of a form of guide plate cooperating with the adaptation shown in Fig. 1.

Fig. 5 is a further suggestive arrangement of parts which function substantially the same as those instanced in Fig. 1.

Fig. 6 is a plan view of Fig. 5.

Fig. 7 is a diagrammatic elevation, partly in section of an oscillating or rocking fruit container in which the principles of Figs. 1 and 5 are carried out in two directions of movement.

Fig. 8 is a developed plan view of a pair of fruit holding bars whose adjacent sides form sinuous curves with respect to each other adapted to prevent the fruit rolling over and over in the same direction.

Fig. 9 represents three variable positions assumed by fruit; at A where no provision is made to overcome its rolling tendency; at B the use of a shallow grooved guide plate for short stemmed fruit; and at C the same adapted to fruit having longer stems.

Fig. 14 is an end elevation of a spring supported stemming disk.

Fig. 15 is a side elevation of Fig. 14.

Fig. 16 is a plan view of Fig. 14.

Fig. 17 is a diagrammatic elevation of the use of stemming disks for slitting or skinning operations.

Fig. 18 is a detached elevation in section of the relation of fruit holder sections to end supporting rings.

Fig. 19 is a side elevation of pairs of inclined stemming disks with a self cleaning driving means.

Fig. 20 is a side elevation of Fig. 19.

Fig. 21 is a diagrammatic plan view of the related driving features of Figs. 12 and 13.

In carrying out the features of my invention in actual practice I may use any of the expedients exemplified in the accompanying drawings or any practical equivalents thereof, or any modifications demanded by the variable conditions of similar kinds of fruits, or those found in different kinds of materials to be handled without departing from the spirit of my invention.

An important feature of the invention lies in the use of any suitable holder in which the fruit is caused to continuously change its position when combined with means for gradually grasping protruding stems and then gently causing the paths of travel of the holder and the stemming means while traversing in the same general direction to slowly diverge from each other so as to gently remove the stems without bruising or injuring the fruit.

In Figs. 1, 5, 7, 10 and 19 are instanced different suggestive means that may be employed to bring about this much desired result. In systems and methods heretofore proposed and used the action of removing the stems is too sudden. This results in the quality of the stemmed fruit being seriously affected because the skins adjacent the point where the stems are attached is badly torn, needlessly releasing juices that should be conserved but which with any washing process that may be employed are usually lost.

Where large quantities of fruits are treated this loss is a serious item. My present method, whether one expedient or another is used, eliminates this waste and at the same time also avoids the general messiness that such premature release of the fruit juices involves.

Figures 10, 11:
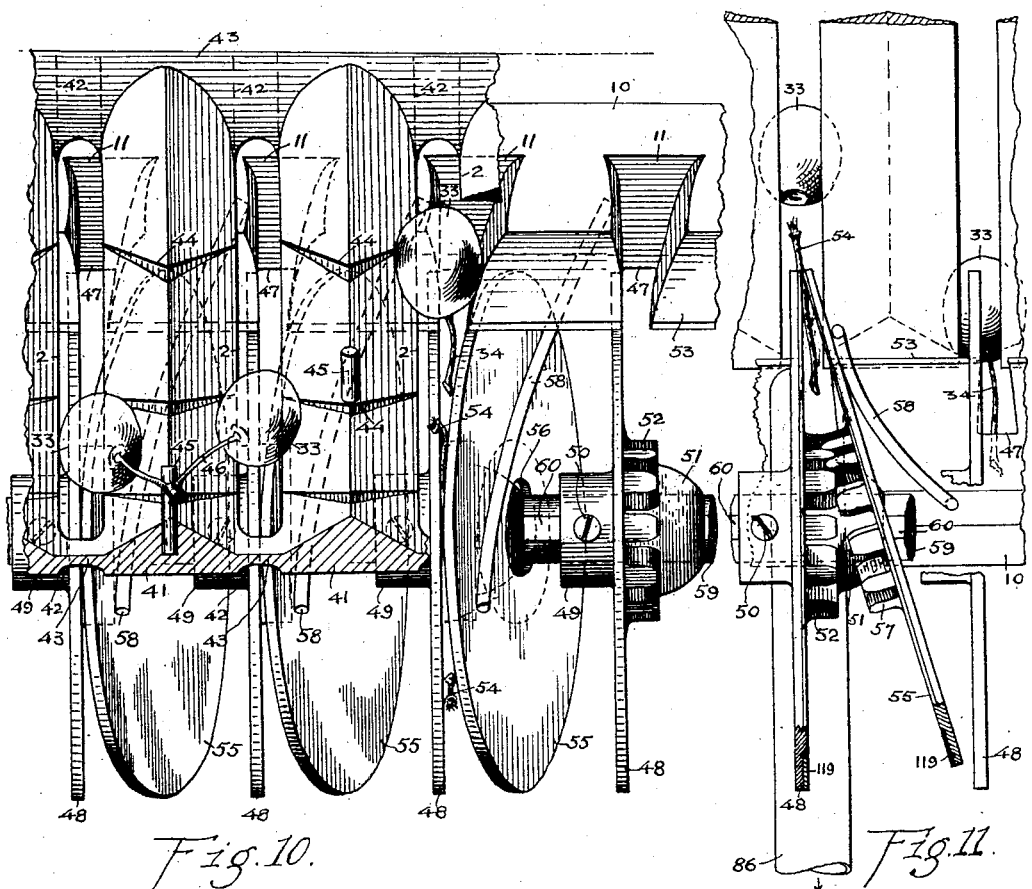
Fig. 10 is an enlarged plan view of assembled parts with portions broken away to show the stemming action of inclined geared disks.
Fig. 11 is a side elevation of a portion of Fig. 10.

In the suggested structure shown diagrammatically in Fig. 1 the grasping action may be made as gradual as wanted and continued as long as desired. In the suggested type instanced in Figs. 5–7 the approach and the recession from the stemming point are both gradual, but the duration of the stemming action is a minimum, not susceptible to change with a given diameter of horizontally moving disks, dependent on the distance which the stem slots are placed apart. In the exemplification of Figs. 10 and 19 the period of stemming action over Fig. 5 is lengthened because of the increased diameter of the stemming disks which revolve in the same direction as the slots through which the stems protrude.

In various proposals made heretofore bands have been used to move at right angles to the path of travel of the fruit, without a gradual entrance and exit to and from the stemming position, resulting in the waste of fruit juices and the disfiguring of the fruit itself, while this second condition is of secondary importance its presence is prima facie evidence that the more vital loss of fruit juices has taken place. Canned goods of mediocre quality are not usually free from these defects but goods of prime quality securing the best market prices must be free from them.

Any suitable carrier whether rotating, oscillating, or reciprocative in action having stem slots 2 therein may be used as instanced in Fig. 1, the slots being separated by bars 13 in Figs. 3 and 18; 14 in Fig. 5; 29 in Fig. 8; 41 in Figs. 10, 14 and 15 and 103 in Fig. 19. These bars may be pyramidal in cross section as instanced in Figs. 3, 10 or 18. The fruit is caused to change its position while resting on the bars through any desired movement that may be applied to them. As instanced, diagrammatically, in Figs. 1–3 the bars are a part of a rotating cylinder and as suggested in Fig. 7 they may be part of a rocking basket.

Figures 12, 13:
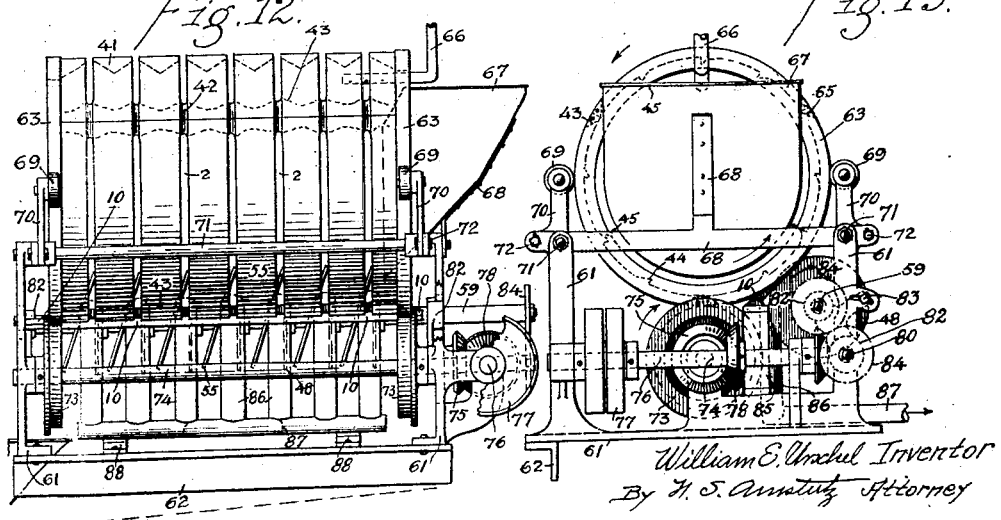
Fig. 12 is a side elevation of an assembled machine in reduced scale.
Fig. 13 is a front elevation of Fig. 12.

When the bars form part of a cylinder they may be grouped together as detachable sections with cross bars 43 having beveled faces joining them, Figs. 10, 12 and 18. They may be made in two, three or more sections as instanced in Fig. 13 and these sections may be supported by end rings 63, Figs. 13 and 18 having shoulders 64 whereon the sections are held in place by screws 65, thus leaving the center of the cylinder quite free. Such a cylinder is driven by suitable interconnected mechanism as hereafter described.

Reverting to Fig. 1 the fruit 33, in this instance suggested as a cherry, has a stem 34 depending into slot 2. Projecting into slot 2 is found a pair of bands 3 and 4 traveling lengthwise of the slot not crosswise as has been proposed heretofore. These bands are carried on flanged wheels 5 supported on any suitable connected frames 12, Figs. 2 and 3, which in turn support curved guides 7 and 8. These guides gradually converge in any desired degree toward 9 so as to make the entrance of the stems 34 to the stemming position as gentle as possible. The guides 7 and 8 may be made as rigid or flexible as needed according to the kind of fruit to be handled.

The distance the guides are placed apart is dependent on the fruit and the thickness of the bands. The more elastic the bands 3 and 4 are made the more rigid the guides 7 and 8 can be formed. The outlet from the stemming position may be gradually widened to release the stems if desired by causing them to separate at an angle to each other. The bands may be driven by separate pulleys 6 or in any other way, their direction of movement being shown by the arrows. Fruit stems 34 are carried between the bands as the cylinder rotates. The fruit cannot pass through slots 2 and the stems are held against being carried along with the fruit, thus as this portion of the cylinder gradually rises it is gradually separated from the stemmer.

Some provision must be made to prevent stems projecting sideways and riding on the top edges of the bands or be carried upon the edges of stemming disks. This is accomplished by means of a guide plate 10 having grooves or slots 11 formed therein see Figs. 4 and 10. The body of the plate comes closely to the outer surface of the cylinder bars and as its grooves 11 are beveled the stems are positively led to the stemming means.

The grooves 11 are made of different depths to be adapted to short or long stemmed fruit. Besides serving to guide the stems into the stemming position, they also serve, see Fig. 9, to prevent the fruit rolling over from stem position 34 to 35 and 36, shown at A, because the ends of the stems engage the bottom of the groove thus retaining the stems in their proper position. Short stems 37 are shown at B and long stems 39 at C of Fig. 9, the former controlled by a shallow groove 38 and the latter by a deeper groove 40. This bottom extends as a tongue 53, Fig. 20 to as near the stemming position as possible.

In harmony with the grooves 11 both the side walls and bottom of the grooves should extend to near the entrance of the stemming position so that the stems will be grasped by the stemmer with very little shifting of and less bruising of the fruit. Rotation of the cylinders causes the fruit to be shifted continuously to provide new opportunities for the stems to enter slots 2. To assist in this projections or "teeth" 44 may be formed on the bars see Figs. 10 and 13 and to cause clusters to be turned over pins 45 may be inserted at several points on the inside of the cylinder bars, see Fig. 10.

This shifting of the fruit is further controlled by making the beveled walls of bars 29, Fig. 8 slight as at 32 or acute as at 31 and forming the peak 30 of the bevels in a wavy line. The curvature of the waves of one bar conform to that of adjacent bars. This prevents fruit whose stems 46 project approximately parallel to the cylinder axis from simply rolling over and over with the stems in the same position. By causing one end to travel faster than the other prevents this.

If required the beveled faces of bars 14 may be curved as at 15 Fig. 5. In this figure small diameter stemming wheels 16 are suggested. They may have flanges 17 so as to get a longer grip on the stems. Short spindles of the wheels have bearing in any kind of supports such as 18 or otherwise. Driving gears 19 at the bottom ends of these stems mesh with each other and a grooved pulley 20 may be used to rotate the wheels.

This form of a stemming device produces movement in adjacent slots 2 in opposite directions which may be taken advantage of by an oscillating basket 21 pivoted at 26 on a frame 25 that may include guide plates 23 having grooves 24 placed both fore and aft of the stemming wheels 16. The basket 21 has bars 14 with slots 2 and open ends 22 through which the fruit can enter and leave it. A rock arm 27 and link 28 serve to impart motion to the basket to rock it to and fro to accommodate itself to the forward movement of stemming wheels 16 at F and their rearward movement at R Fig. 6.

Whatever form of stemming devices may be used in connection with a cylindrical holder or container it is important that the same be placed as close to the bars as possible or that they extend into slots 2 as shown in Figs. 3, 15 and 19. This position in the case of cylinders having connections 43 between the several bars necessitates the formation of grooves 42 across such connections as also shown in Figs. 10 and 14. The grooves 11 of plates 10 lead up to slots 47 and the bottom continues on a tongue 53 formed between a pair of such slots. Stemming disks 104, 89, 94 or 48 and 55 have free movement in these slots without engagement therewith.

If desired air suction may be used through main pipe 87, subsidiary tubes 86 and openings 116 being formed in grooves 11, see Figs. 12 and 20, to assist in more rapidly bringing the stems into these grooves. This system of pipes may be held in place by supports 88 and the suction in them produced in any desired manner.

The vertically moving disk edges approach the stemming position in the same direction as the cylinder travels at this point. They may assume the form and position shown in Figs. 10, 14 or 19. The adaptation instanced in Fig. 10 comprises a horizontal shaft 59 having a flattened face 60 against which set screws 50 in hubs 49 of disks 48 abut. Each one of these disks has a hemispherical guiding hub 51 and a series of teeth 52 encircling it. Companion disks 55 stand at an angle to disks 48. They have central openings 56 through which shaft 59 passes. The edges of these openings ride on the rounded hubs 51 and the disks 55 are themselves provided with an annular set of teeth 57 which mesh with teeth 52. As the shaft 59 is rotated both disks are carried with it. A spring stem 58, Figs. 10 and 11, for each disk 55 is supported by plate 10. These are sufficiently elastic to accommodate various thicknesses of fruit stems coming between the disks which at the same time are stiff enough to secure the necessary gripping action on the stems so as to remove them as shown at 54.

Instead of disks 55 a plain disk 94 with a distancing hub 95 may be used in connection with elastically supported disks 89 Figs. 14 and 15. The latter disks have central openings 90 in which the spiral end 92 of coil spring 91 is secured by fastening clips 93. Tension stems or wires 102 project out from plates 10 and they have rollers 101 at their outer extremity to roll against disks 89 to hold them against hubs 95 and the upper edge of companion disks 94. The wires 102 perform the same functions as wires 58.

In order to continuously clean the disks a scraping blade 96 may be used Figs. 14 and 15 to engage their edges and sides and free them from accumulations. To assist in this cleansing step and at the same time wash the fruit a pipe 66 Figs. 12 and 13 may extend into the cylinder and a supply of water delivered in any desired form over the fruit within the cylinder.

When in operation the machine stands at an incline as shown by the dotted line at the bottom of Fig. 12 so as to cause the fruit to travel through it. The fruit is delivered into a hopper 67 that is supported by a bracket 68 attached to one of the end frames 61. These frames are held together by under bars 62. They provide bearings etc., for the driving mechanism. This consists of shaft 74 with flanged supporting wheels 73 on which the end rings 63 of the cylinder rest and by means of which the cylinder is rotated.

The shaft 74 has a bevel gear 75 that meshes with a companion bevel gear 78 on driving shaft 76 supplied by pulleys 77. This shaft 76 also carries bevel gear 79 which meshes with bevel 81 on short shaft 80 so as to rotate the latter and through change gears 84 transmit motion to the stemming shaft 59. The forward end frame 61 besides supporting the hopper 67 also supports shafts 74, 76 and 80.

In order that the stemming disks instanced in Figs. 10 and 11 may be easily adjusted into the best working relation to slots 2 the shaft 59 has bearing in two swinging arms attached to rod 117. The center of this rod coincides with that of short shaft 80. It has bearing in the end frames and by reason of the rigid attachment of arms 82, both ends of shaft 59 are moved at the same time causing all the disks to be adjusted simultaneously and when placed where desired a set screw 83 locks the parts in position.

The cylinder is kept central over flanged wheels 73 by four side rollers 69 supported at the ends of short arms 70 which are connected to each other in pairs by rods 71 so that a pair of rollers can be adjusted at the same time, lock nuts serve to hold the parts in the best working relation. The guide plate 10 is also supported by a projection 85 from the end frames 61.

The disks 97 sharply beveled at 98 project into slots 2 Fig. 17 so as to engage fruit 100 from which the skin is to be removed. The fruit rests on bars 99 and the action of the disks etc. as to direction of rotation is the same as used when similar disks are used for stemming alone. Should it be desired to skin the fruit by means of heat and air suction in the usual well known way and it is important to secure large output the skins must first be slitted to start the separation, this is readily accomplished by using only a single sharp edged disk in each slot, the direction of movement etc., being the same as already described.

When both disks of a stemming pair are to be set at an angle the expedient instanced in Fig. 13 is employed. The disks have hollow hubs 105 in which the "T" ends 107 of supporting rods 106 seat. This forms the bearing of these disks. They are driven by beveled disks 108 and 110. Both have rubber faced bevels 109 which serves to drive disks 104 and at the same time keep them clean.

A water pipe 118 may be placed between each pair of disks if desired to allow water to trickle onto the disks 104 and facings 109. Disks 110 have hubs in which set screws 111 are placed to hold them on driving shaft 112. Disk 108 rotates with the shaft 112 but also has endwise movement thereon to compensate for variations in the sizes of fruit stems. A slot 113 is formed in its hub and a pin 114 secured to the shaft is seated therein while a coil spring 115 abutting both hubs of adjacent disks keeps disk 108 in elastic engagement with its stemming disk 104. If desired the stemming disks may be rubber faced as shown at 119 Fig. 11.

What I claim is,

1. In fruit stemmers, a movable container, having narrow slots therein extending in the same general direction as the container is moved, with supporting bars between the slots, stemming means operative adjacent the container comprising grasping elements which gradually approach each other opposite the slots of the container while moving in the same direction at this point as the container, and means for gently separating the one from the other so as to retain the fruit in the container and withdraw the stems without injury to the fruit.

2. In fruit stemmers, a movable container, openings therein of a size less than that of the fruit to be treated, stemming means placed in line with such openings, and means for moving the container and stemmer in the same direction while gently and increasingly separating them in order to automatically remove the stems from the fruit.

3. In fruit stemmers, a movable container, narrow slots in the walls thereof extending in approximately the same direction as the line of movement of the container, stemming means placed adjacent the slots adapted to gradually grasp stems which protrude through the slots, and means for imparting motion to the stemmer in the same direction as the container is moved so as to thereby remove stems from various kinds of fruits.

4. In fruit stemmers, a movable container with an unobstructed entrance and exit, a series of circumferential bars forming the walls of the container and defining narrow slots between them, separate and independent stemming means for each of the slots movable in the same direction as the container is actuated, and means for gently separating the container and stemmers after protruding stems have been grasped whereby they are automatically removed from the fruit.

5. In fruit stemmers, a movable container comprising a skeleton cylinder having narrow circumferential slots therein, transverse or axially aligned bars extending across such slots, external grooves across such bars in continuation of the slots, stemming means for each of the slots projecting into the same, and means for imparting motion to the stemming means in the same direction as the cylinder moves at that point where the stemmers are located.

6. In fruit stemmers, a movable container comprising a series of circumferential bars with narrow slots therebetween, said bars being joined at points by cross bars, separate stemming means adjacent each slot, and means for producing a suction for each stemmer.

7. In fruit stemmers, a movable container having openings therethrough, adapted to hold fruit so that the stems thereof may project through openings in the walls of the container, stemming means cooperating with such openings to automatically clamp and remove the stems in a gradual manner so as to not injure the fruit.

8. In fruit stemmers, a rotatable cylinder with unobstructed open ends, and an unobstructed open center, comprising circumferential bars joined by grooved cross bars, the circumferential bars being so spaced as to form narrow slots therebetween in line with the grooves of the cross bars, a plurality of stemming elements projecting one pair into each slot, and means for moving the cylinder and stemmer at the stemming position in the same direction while gradually separating the one from the other.

9. In fruit stemmers, a container having stem receiving slots between fruit holding bars, means for imparting motion to the container, stemming means placed adjacent the slots, means for moving the stemmers in the same direction as the container is actuated and simultaneously gradually separating the stemmers and container.

10. In fruit stemmers, a movable container having slotted openings having stem receiving slots, separate stemming means for each slot, means for moving both at their point of nearest approach in the same direction, and means for gradually drawing the container and stemmers toward each other to initiate the stemming action and subsequently gradually separate them to complete the removal of the stems.

11. In fruit stemmers, a movable container, means for directing the stems of fruit to protrude through slots formed in the container walls, stemming means for gradually grasping and gradually removing the stems from the fruit, means for feeding water to the container, means for guiding the stems to the point where they are to be removed, means for scraping or cleaning the stemmers, and means for driving the stemmers with respect to the container at different speeds.

12. In fruit stemmers, a movable container, circumferential bars forming discontinuous narrow slots between them, a series of angularly disposed disks flexibly held with the periphery of pairs of disks in engagement or close contact with each other, and means for rotating the disks so that they move in the same direction as the container adjacent it.

13. In fruit stemmers, a movable container having slotted openings, means for directing fruit stems through the slotted openings in the container walls, stemming means adjacent each slot, means for moving the container adjacent the stemmers and the latter in the same direction, and means for simultaneously adjusting all the stemmers with respect to the container simultaneously.

14. In fruit stemmers, a movable container comprising a plurality of circumferential bars constituting its walls with narrow slots between adjacent bars, a plurality of rotating disks grouped in pairs the members of each pair disposed at an angle to each other with their extreme peripheral edges in engagement or in close contact at one point only immediately adjacent the container walls, and means for moving the disks and container at the point where they nearest approach each other in the same direction.

15. The process of stemming fruit consisting in subjecting the fruit to movement so as to continuously change its position in first clamping the fruit stems and thereafter gradually pulling them from the fruit while the stems and fruit traverse in the same direction.

16. The process of treating fruit consisting in placing the fruit in a movable container, having slots in its walls, in causing continuously moving cutting means in the slots to slit the skins of the fruit as desired.

17. In fruit stemmers, a rotatable container with circumferential bars placed adjacent each other with slots between them, stemming means cooperating with each slot, a detachable guide common to all the stemming means, individual guiding grooves for each slot the depth of the grooves being variably adapted to short or long stemmed fruit whereby the stems will remain in the container slots and in engagement with the bottoms of the grooves to prevent the fruit rolling over and lifting the stems from the slots before the stems can be removed.

18. In fruit stemmers, a movable container, parallel bars forming the walls of the container placed adjacent each other, with narrow grooves therebetween, varying beveled inner faces to the bars, whereby fruit rolling on a pair of bars will be prevented from rolling over and over in the same direction.

In testimony whereof I affix my signature.

WILLIAM E. URSCHEL.